United States Patent [19]
Elliott

[11] 3,789,872
[45] Feb. 5, 1974

[54] HYDRAULIC CONTROL MEANS FOR CHECK VALVES

[76] Inventor: Robert E. Elliott, 5336 E. 6th, Tulsa, Okla.

[22] Filed: May 31, 1972

[21] Appl. No.: 258,452

[52] U.S. Cl.................... 137/514, 137/554, 251/54, 251/282
[51] Int. Cl............................................ F16k 21/10
[58] Field of Search...... 137/514, 554, 527; 251/48, 251/54, 55, 282

[56] References Cited
UNITED STATES PATENTS

| | | | |
|---|---|---|---|
| 3,177,894 | 4/1965 | Camp................................ | 137/514 |
| 3,331,583 | 7/1967 | Baker............................... | 251/282 X |
| 3,254,660 | 6/1966 | Ray.................................. | 251/54 X |
| 3,706,321 | 12/1972 | Vicari............................... | 137/554 |
| 3,064,675 | 11/1962 | Johnson et al..................... | 251/54 X |
| 3,177,895 | 4/1965 | Danel............................... | 251/54 X |

Primary Examiner—William R. Cline
Attorney, Agent, or Firm—Head & Johnson

[57] ABSTRACT

This invention describes an improved hydraulic control means for a check valve in a gas pipeline. A hydraulic cylinder which is nominally operated at a low pressure has a piston which is connected by connecting rod to the clapper of the valve. As the clapper opens under gas pressure in the pipeline, hydraulic liquid is permitted to pass from one side of the piston to the other through a controlling choke valve with bypass, so that the piston offers nominal resistance to the movement of the opening clapper. On the other hand, when the gas flow in the pipeline reverses, and the clapper tends to close, the check valve prevents flow to the first bypass around the piston, and forces the liquid flow around the piston through an orifice or restriction of controlled size, so as to control the rate at which the clapper is permitted to close. This prevents high velocity slamming of the clapper against its seat.

7 Claims, 3 Drawing Figures

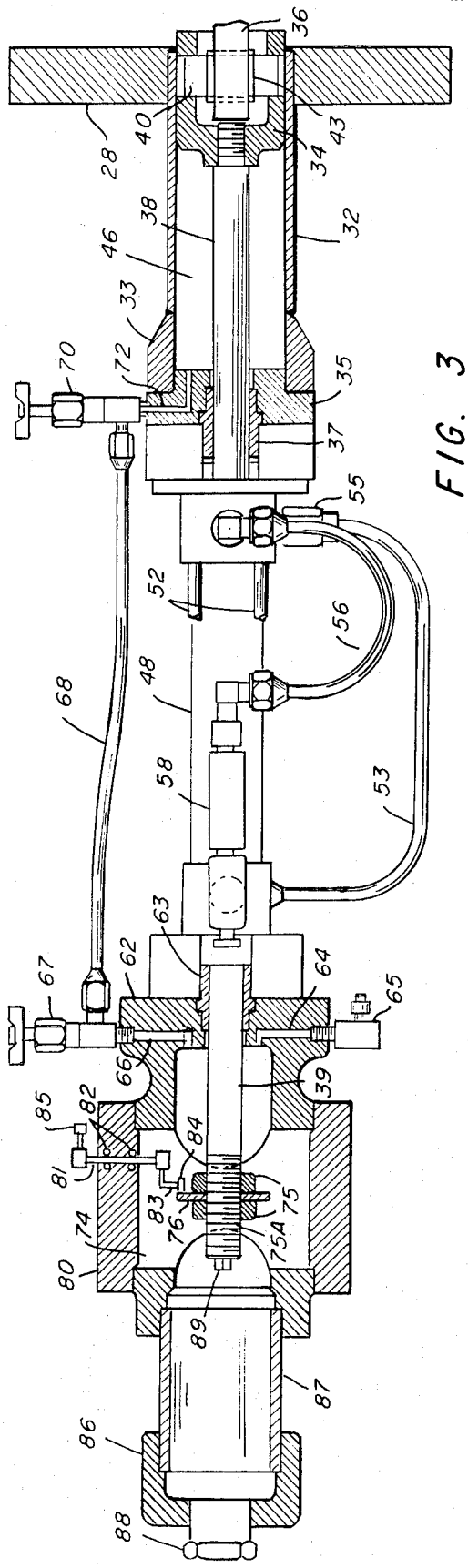
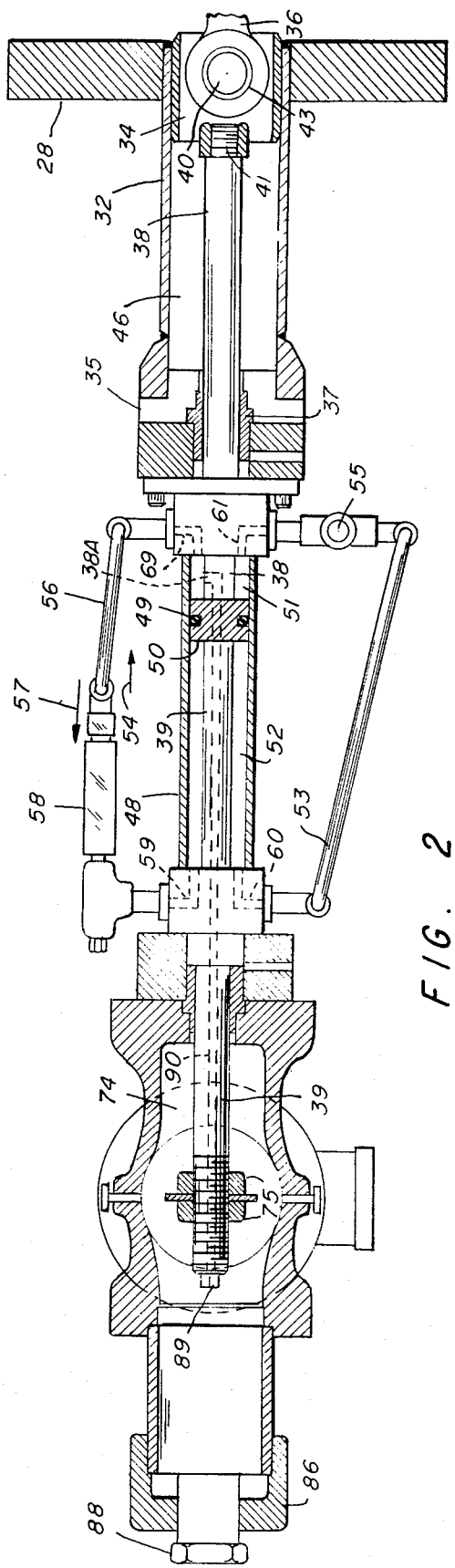
FIG. 3
FIG. 2

HYDRAULIC CONTROL MEANS FOR CHECK VALVES

CROSS REFERENCE TO RELATED APPLICATION

This application is related to U. S. Pat. No. 3,177,894 to George Camp, entitled CONTROLLED ACTION CHECK VALVE, issued Apr. 13, 1965.

BACKGROUND OF THE INVENTION

This invention lies in the field of fluid control valves. More particularly, it is concerned with clapper type swing check valves, including hydraulic means to retard the closing rate of a clapper at a preselected rate.

Most check valves on the market are constructed with a shaft which carries the clapper and which extends outwardly through the wall of the valve. This shaft carries a control arm thereon. Any restraint in the form of hydraulic apparatus can be attached to this arm to control the opening and closing of the clapper. However, this kind of valve has a weakness in that the seal through which the clapper shaft passes through the wall of the valve provides many problems of leakage under the high gas pressure in the valve and the pipeline. In my system the connecting rod controlling the movement of the clapper is positioned inside of the valve chamber under the gas pressure in the pipeline. The hydraulic portion of the control is outside of the valve and is maintained at atmospheric pressure—except when retarding clapper descent.

SUMMARY OF THE INVENTION

It is a primary object of this invention to provide a hydraulic control means to prevent the slamming closed of the clapper of a check valve under the flow of gas through the check valve.

This object is realized and the limitations of the prior art are overcome in this invention in which the check valve which is placed in the fluid pipeline has a connecting rod from the clapper to a vertical tube attached to the top of the valve. There is a crosshead mounted inside this vertical tube which is adapted to move vertically, guided by the tube. The connecting rod is rotatably connected to this crosshead. The piston rod of a hydraulic cylinder passes through the top closure of the vertical tube. The piston rod is sealed through the closure and is connected to the crosshead. Operation of the piston rod therefore through the medium of the connecting rod, controls the position of the clapper. The space inside of the vertical tube is maintained in an atmosphere of high pressure gas corresponding to that in the pipeline. Some of this may leak through the packing around the piston rod. Special means are found to bleed off any such pressure due to this leakage, and to maintain the hydraulic system at an independent pressure. Bypass means are provided between the spaces on the two sides of the piston in the hydraulic cylinder. In one direction of flow the liquid passes readily through a check valve. This corresponds to the opening operation of the clapper. The other bypass has an orifice or other restricting means therein, so that the rate of liquid flow is controlled, and the closing motion of the clapper is retarded.

BRIEF DESCRIPTION OF THE DRAWINGS

This and other objectives of this invention and a better understanding of the principles and details of the invention will be evident from the following description taken in conjunction with the appended drawings, in which:

FIGS. 2 and 3 show two views of the hydraulic apparatus which is used to control the motion of the clapper.

DESCRIPTION OF THE PREFERRED EMBODIMENT

Figure 1:
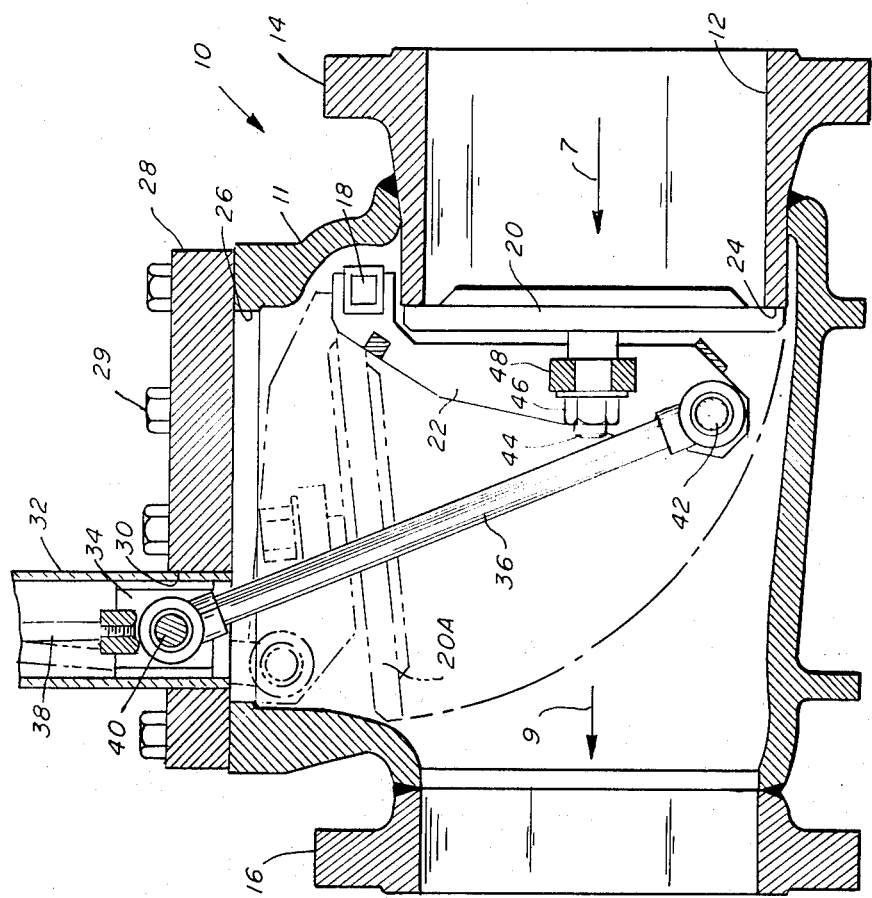
FIG. 1 represents a generalized sketch of a check valve adapted to be inserted into a pipeline, and a hydraulic cylinder means to control the motion of the clapper of the check valve.

Referring now to FIG. 1, the general arrangement is shown by which a hydraulic cylinder and piston rod is used to control the movement of a clapper in a check valve. The valve itself is indicated generally by the numeral 10. This comprises a body 11 having a central bore 12 which corresponds to the inner diameter of the pipeline. There are two flanges 14 and 16 by means of which the valve can be inserted into and connected to the pipeline, as is well known in the art. There is a horizontal shaft 18 which is journaled in bearings inside the body of the valve. The bearings are not shown, but well known in the art. This shaft 18 supports an arm 22 which carries a clapper 20, which in its lowest position, is adapted to seal against the seat 24. The nominal direction of gas flow through the valve is indicated by the arrows 7 and 9. When the flow is in this direction, there is pressure against the clapper 20 which pushes it away from the seat. Under strong flow this pressure will lift the clapper up into the position shown in dashed lines in the upper part of the valve casing. The clapper in that position is indicated by the numeral 20A.

When the forward flow ceases the clapper is no longer held up by the flow, it tends to drop. If there is a corresponding reverse flow that is opposite to the direction of the arrows 7 and 9, the clapper will drop at high velocity and will slam against the seat. This slamming is possibly damaging to the sealing fit of the clapper on the seat. Worse yet it will cause dynamic effects in the pipeline, such as "water" hammer, etc., which can seriously damage the valve and pipeline. Thus it becomes important to provide for the free opening of the check valve and controlled closing. The opening is caused by forward flow of the fluid; the closing is caused by the reverse flow of the gas. Restraint is provided so as to minimize the velocity at which the clapper closes. The clapper 20 is fastened by means of a stem 44 and nut 46 to a boss 48 which forms part of the arm 22.

A connecting rod 36 has one end fastened rotatably to the arm 22 by means of pin 42. As the clapper opens and moves to its upper position, the connecting rod will move upwardly into the vertical tubular portion 32 of the valve casing. The upper end of the connecting rod 36 is adapted to rotate about a short shaft 40 which is mounted inside of a crosshead 34 which is adapted to fit into and slide freely within the vertical tube 32. This portion of the connecting rod 36 is shown in better detail in FIG. 2 where the rod itself has a bushing 43 and is adapted to turn around the shaft. The head 34 slides inside the tube 32.

The improvement of this invention lies in the apparatus shown and described in terms of FIGS. 2 and 3. The plate or body cover 28 corresponds to the part of the same number in FIG. 1, and the tube 32 corresponds to that of the same number in FIG. 1. The crosshead 34 has a threaded seat into which a threaded end 41 of the piston rod 38 is threaded.

The upper end of the tube 32 terminates in a closure 35 which has a central bore to seat a seal means 37 which snugly and sealably fits the exterior of the piston rod 38. The piston rod 38 passes through the seal and into the hydraulic cylinder 48. In FIG. 2 this is shown as a piston 50 sealed by means 49 inside of the cylinder 48. Piston rod 38 is attached to the piston on one side, and the piston rod 39 attached to the piston on the other side. Piston rod 39 may be drilled with opening 90 shown dashed which is closed by plug 89 on the top end of the piston. The drilled opening 90 extends through the piston and to opening 38A in piston rod 38. Any air trapped in the hydraulic liquid can be bled out through opening 38A into bore hole 90 and can be permitted to escape through plug 89. A plurality of steel rods 52 shown in FIG. 3 are used to tie together the head structure to each end of the hydraulic cylinder 48. These are tightened by nuts not shown, but well known in the art. As shown in FIG. 3 the piston rod 39 extends through a second seal 63 in a head 62 and extends into space 74 which is sealed. On the end of the piston rod 39 two nuts 75 are tightened up against a disc 76 which serves as a means of operating a limit switch to indicate the precise position of the piston and therefore of the clapper.

There are two fluid systems in this device. There is a gas space 46 on the end which attaches to the valve, in which there is gas pressure corresponding to that in the pipeline which, for example, may be a gas at a pressure of 1,000 lbs per square inch. In the cylinder 48 there is separate hydraulic liquid which is nominally kept at atmospheric pressure. During normal operation gas pressure is kept in chamber 74 at the same pressure as in space 46. This is accomplished by means of opening the valve 70 connected through conduit 72 to the space 46 through pipe 68 to the valve 67 which connects to conduit 66 to the space 74. With gas pressure on both sides of the hydraulic cylinder the same, there is a balance of forces. The force equal to gas pressure and acting upward on rod 38 is equal and opposite the force equal to gas pressure and acting downward on rod 39.

This is true because rod 38 has the same diameter and cross-sectional area as does rod 39, and because the same gas pressure is exerted on each rod since area 46 is interconnected to area 74, as explained.

In this connection, reference is made to U. S. Pat. No. 3,177,894, granted to G. F. Camp, issued Apr. 13, 1965. In this patent, as in this invention, a piston is used to retard the closing action of the clapper. However, since there is only one piston rod, which is exposed to the pressure in the pipeline, the piston must be exposed on its other side to a corresponding force. Thus, an accumulator shown in FIG. 2, is used to apply part of the pressure in the pipeline to exert a downward force on the piston equal and opposite to the upward force exerted on the exposed end of the piston rod. This requires careful adjustment to provide this balance.

In this invention the use of a hydropneumatic accumulator is not required, since there are now two piston rods, one on each side of the piston, which have equal cross-sectional area, and both of which are exposed to the same pressure of the gas in the pipeline. Thus, there is no adjustment of opposing forces required, they are always balanced, and the pressure in the hydraulic cylinder can be maintained at atmospheric pressure, except when there is downward motion of the clapper.

Referring again to FIG. 2, the space 51 on one side of the piston, and space 52 on the other side of the piston have two bypass lines 53 and 56 for liquid flow. When the clapper rises to open and pushes the piston rod to the left in FIG. 2 liquid in the space 52 then passes by way of conduit 59 and pipe 56, in accordance with the arrow 54, through a control valve 58 and conduit 56 into the space 51. Relatively little resistance is offered to the flow of fluid so the valve clapper can then open as rapidly as the gas stream forces it upward.

However, if the gas stream reverses and the clapper is then caught and driven against the seat, liquid flow will then tend to pump from the space 51 to the space 52. However, the control valve 58 restricts its flow through the pipe 56. Liquid can, with restricted flow pass through the conduit 69 and pipe 56 in accordance with the arrow 57. However, it is restrained by orifice, needle valve, or other means in control valve 58. This restraint can be varied to any degree desired, so that the downward movement of the clapper can be retarded to avoid its slamming into the seat.

The advantages of this hydraulic control system are that the gas pressure can be balanced since both piston rods can be made to operate in the same gas pressure. The hydraulic control means for the resistance to the movement of the clapper will be entirely independent, then, of pressure in the pipeline. Also, it is convenient to adjust and change the restriction in the flow line 56 so as to obtain the desired resistance to flow and antislamming control.

A safety relief valve 55, with liquid bypass line 53 is used to provide a ceiling on the maximum hydraulic pressure which the clapper may cause to be developed in space 51. Safety valve 55 is set to relieve liquid pressure at that maximum safe liquid pressure for which the hydraulic cylinder 48, crosshead 34 and connecting rod 36 have been designed, thus preventing a mechanical failure of said parts.

In FIG. 3 at the left end of the apparatus there is shown the cover plate 80, which is bolted in conventional manner to seal the chamber 74. There is a bearing for a shaft 81 and means 82 to seal the shaft against gas pressure. Inside the chamber 74 there is an arm 83 fastened to the shaft 81 and rotating with it a roller 84 which has an operating relationship with the disc 76 fastened to the piston rod 39. As the piston moves to the right towards its limit, the disc 76, which is held in position on piston rod 39 by means of threads 75A and nuts 75, presses on the roller and causes the shaft 81 to turn to a limiting angle. On the outside of the plate 80 there is an arm 85 on the shaft which is in operating relationship with a switch (not shown) so that as the arm rotates to its limiting position, arm 85 closes the switch and a signal is indicated that the shaft has moved to its terminal position on the right, and the clapper is in the closed position. This is shown in schematic form, but it is well known in the art how such an element could be sealed properly against the internal pressure, etc., and such details need not be described further, save to point out that the disc 76 can be used to indicate elsewhere that the valve is in the closed position, for example.

Provision is made to lift the clapper mechanically and hold it up whenever a pig is to be passed. This is done by removing plug 88 in the end closure 86 of the space 74. A puller is screwed on to threads 75A and the piston rod 39 is pulled to the left, carrying with it the clapper. The ability to raise and then lower the clapper by this mechanical means is of great advantage in obtaining the best adjustment of the restrictor in control valve 58, in the field. This is especially true if the valve is in a buried pipeline.

While the invention has been described with a certain degree of particularity, it is manifest that many changes may be made in the details of construction and the arrangement of components. It is understood that the invention is not to be limited to the invention, but the invention is to be limited only by the scope of the attached claims, including the full range of equivalency to which each element or step thereof is entitled.

What is claimed:

1. In a check valve of the clapper type installed in a high pressure gas pipeline including a hinged clapper, the improvement comprising means to control the slamming of said clapper against its seats on reversal of flow, comprising:
   a. a chambered cylindrical hydraulic apparatus having in a central chamber a cylinder having hydraulic liquid therein, a piston slidably and sealably received in said cylinder;
   b. a first piston rod attached to said piston on a first side and sealed through a first header on a first end of said cylinder, said first piston rod extending into a first gas chamber;
   c. said first gas chamber attached at its first end to said first header and at its second end to the housing of said valve, said first gas chamber exposed to the gas pressure in said valve, slider means in said first gas chamber attached to said first piston rod;
   d. connecting rod means rotatably connected to said clapper and to said slider;
   e. second piston rod means attached to the second side of said piston and sealed through a second header on the second end of said cylinder, said second piston rod extending into a second gas chamber;
   f. said first and second piston rods having substantially equal cross sectional areas opened to the pressure in the respective gas chambers;
   g. said second gas chamber comprising a sealed chamber attached to said second header;
   h. bypass means extending between the first and second gas chambers for equalizing the pressures therein with the gas pressure in the valve; and
   i. valved passageway means providing communication between the opposite sides of the piston for controlling the flow of hydraulic liquid from one side of said piston to the other and allowing substantially unrestricted liquid flow in an opposite direction.

2. The check valve as in claim 1 in which said valved passageway means comprise check valve means for hydraulic liquid flow in the direction to permit opening of said clapper, and flow restriction means for controlling hydraulic liquid flow in the direction to permit closing of said clapper.

3. The check valve as in claim 2 including pressure relief means attached to said hydraulic cylinder on the side of said piston to which said first piston rod is connected.

4. The check valve as in claim 1 including limit switch means responsive to the movement of said piston.

5. The check valve as in claim 1 including means to mechanically lift the clapper to open the valve.

6. The check valve as in claim 1 including means to bleed air from the hydraulic liquid.

7. The check valve as in claim 1 wherein said bypass means includes valve means to equalize pressure in said second gas chamber with the pressure in said first gas chamber.

* * * * *